United States Patent
Kasahara

(10) Patent No.: US 9,325,909 B2
(45) Date of Patent: Apr. 26, 2016

(54) IMAGE CAPTURING SYSTEM HAVING A VIRTUAL SWITCH ON A SURFACE OF A BASE OF A MOUNTING STAND

(71) Applicant: PFU LIMITED, Ishikawa (JP)

(72) Inventor: Yuki Kasahara, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/072,558

(22) Filed: Nov. 5, 2013

(65) Prior Publication Data

US 2014/0168506 A1    Jun. 19, 2014

(30) Foreign Application Priority Data

Dec. 17, 2012 (JP) ................................. 2012-274586

(51) Int. Cl.
| | |
|---|---|
| H04N 5/235 | (2006.01) |
| H04N 5/225 | (2006.01) |
| H04N 1/195 | (2006.01) |
| H04N 1/00 | (2006.01) |

(52) U.S. Cl.
CPC ......... *H04N 5/2354* (2013.01); *H04N 1/00381* (2013.01); *H04N 1/19594* (2013.01); *H04N 5/225* (2013.01); *H04N 5/2251* (2013.01); *H04N 5/235* (2013.01); *H04N 1/00307* (2013.01); *H04N 2201/0436* (2013.01)

(58) Field of Classification Search
CPC ..... H04N 5/225; H04N 5/235; H04N 5/2251; H04N 5/2354
USPC ........................................................ 348/370
See application file for complete search history.

(56) References Cited

U.S. PATENT DOCUMENTS

| | | | |
|---|---|---|---|
| 5,084,611 A * | 1/1992 | Okisu ................. | H04N 1/195 250/208.1 |
| 5,444,486 A | 8/1995 | Mizuno et al. | |
| 5,594,502 A | 1/1997 | Bito et al. | |
| 5,978,028 A | 11/1999 | Yamane | |
| 6,317,155 B1 | 11/2001 | Ohyama | |

(Continued)

FOREIGN PATENT DOCUMENTS

| | | |
|---|---|---|
| CN | 1584728 A | 2/2005 |
| CN | 102196143 A | 9/2011 |

(Continued)

OTHER PUBLICATIONS

U.S. Office Action issued in U.S. Appl. No. 14/183,185 dated Jun. 20, 2014.

(Continued)

*Primary Examiner* — Roberto Velez
*Assistant Examiner* — Abdelaaziz Tissire
(74) *Attorney, Agent, or Firm* — McDermott Will & Emery LLP

(57) ABSTRACT

An image capturing system includes a smartphone serving as an imaging unit, and a mounting stand to be disposed on a medium setting surface on which a medium serving as a reading target is set. The mounting stand has a placement surface on which the smartphone is placed at a position allowing the smartphone to image the medium set on the medium setting surface. When generating a starting trigger based on image information of an imaging area in the state where the smartphone is placed on the mounting stand, the smartphone executes a function (scanning operation) associated with the starting trigger.

4 Claims, 12 Drawing Sheets

(56) References Cited

U.S. PATENT DOCUMENTS

| | | | |
|---|---|---|---|
| 6,540,415 B1 | 4/2003 | Slatter et al. | |
| 7,626,634 B2 | 12/2009 | Ohki et al. | |
| 8,553,090 B2 | 10/2013 | Shiu et al. | |
| 8,559,063 B1* | 10/2013 | Booppanon | G03B 17/561 358/302 |
| 8,767,056 B2 | 7/2014 | Carpenter | |
| 8,781,311 B1 | 7/2014 | Hatzav et al. | |
| D714,775 S | 10/2014 | Yoo et al. | |
| 2003/0025951 A1* | 2/2003 | Pollard | G06F 3/0425 358/505 |
| 2003/0081014 A1* | 5/2003 | Frohlich | G06F 3/038 715/856 |
| 2004/0233325 A1 | 11/2004 | Lee et al. | |
| 2005/0040298 A1 | 2/2005 | Ohki et al. | |
| 2005/0088543 A1 | 4/2005 | Yoshii | |
| 2005/0168627 A1 | 8/2005 | Yi et al. | |
| 2005/0174473 A1 | 8/2005 | Morgan et al. | |
| 2006/0045379 A1 | 3/2006 | Heaney et al. | |
| 2006/0077286 A1 | 4/2006 | Wenderski | |
| 2006/0110152 A1 | 5/2006 | Sukenari et al. | |
| 2007/0035655 A1 | 2/2007 | Chen et al. | |
| 2007/0188830 A1* | 8/2007 | Watanuki | H04N 1/00681 358/487 |
| 2007/0213590 A1 | 9/2007 | Squicciarini | |
| 2008/0062263 A1 | 3/2008 | Shiu et al. | |
| 2009/0002548 A1 | 1/2009 | Liang et al. | |
| 2009/0202236 A1 | 8/2009 | Hama et al. | |
| 2010/0321561 A1 | 12/2010 | Duncan et al. | |
| 2011/0157376 A1* | 6/2011 | Lyu | H04N 5/144 348/207.11 |
| 2011/0288964 A1* | 11/2011 | Linder | B25J 9/1689 705/27.1 |
| 2012/0169888 A1 | 7/2012 | Clark | |
| 2012/0230056 A1 | 9/2012 | Hanaoka et al. | |
| 2012/0320262 A1 | 12/2012 | Chung | |
| 2014/0037296 A1 | 2/2014 | Yamada et al. | |
| 2014/0055990 A1 | 2/2014 | Reed | |
| 2014/0160345 A1* | 6/2014 | Takabatake | H04N 5/2256 348/370 |
| 2014/0160350 A1* | 6/2014 | Takabatake | H04N 5/247 348/376 |
| 2014/0168506 A1 | 6/2014 | Kasahara | |
| 2015/0117849 A1* | 4/2015 | Kasahara | G03B 15/02 396/164 |
| 2015/0138432 A1* | 5/2015 | Takabatake | H04N 5/2256 348/370 |
| 2015/0181072 A1* | 6/2015 | Kasahara | H04N 1/19594 358/475 |
| 2015/0271412 A1* | 9/2015 | Aono | H04N 5/23293 348/241 |
| 2015/0271451 A1* | 9/2015 | Hayashi | H04N 7/18 348/77 |

FOREIGN PATENT DOCUMENTS

| | | |
|---|---|---|
| JP | 2005-099708 A | 4/2005 |
| JP | 2005-328168 A | 11/2005 |

OTHER PUBLICATIONS

Kazuhiro Ikeda et al., "Reading Lamp that can Scan Books: LED Desk Lamp with Internal Camera", http://gadget.itmedia.co.jp/gg/articles/1201/20/news127.html with English translation, Updated: 8:45 pm, Jan. 20, 2012.

Non-Final Office Action U.S. Appl. No. 14/072,655 dated Dec. 5, 2014.

Final Office Action U.S. Appl. No. 14/183,185 dated Jan. 22, 2015.

Non-Final Office Action U.S. Appl. No. 14/072,612 dated Aug. 19, 2015.

Final Office Action U.S. Appl. No. 14/072,655 dated Jun. 15, 2015.

Non-Final Office Action U.S. Appl. No. 14/183,185 dated May 22, 2015.

Office Action Chinese Patent Application No. 2015122201692530 dated Dec. 25, 2015.

\* cited by examiner

<NO FINGER IS PRESENT>

36

DETERMINATION AREA

STANDARD VARIATION OF DETERMINATION AREA $\sigma_b$ <THRESHOLD

TONE VALUE

<FINGER IS PRESENT>

36

FINGER

DETERMINATION AREA

STANDARD VARIATION OF DETERMINATION AREA $\sigma_f$ >THRESHOLD

TONE VALUE $\sigma_1$<THRESHOLD
$\sigma_2$<THRESHOLD
TRIGGER=FALSE $\sigma_1$>THRESHOLD
$\sigma_2$<THRESHOLD
TRIGGER=TRUE FIG.9A
FIG.9B
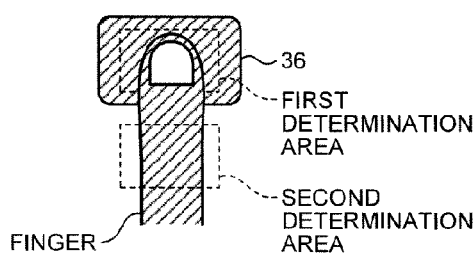
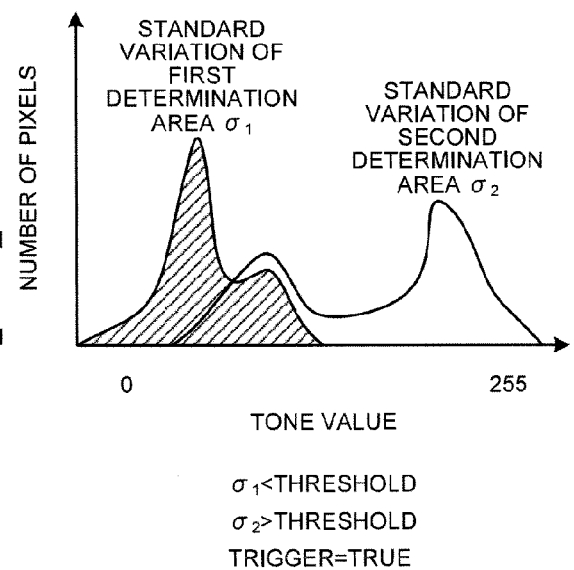

IMAGE CAPTURING SYSTEM HAVING A VIRTUAL SWITCH ON A SURFACE OF A BASE OF A MOUNTING STAND

CROSS-REFERENCE TO RELATED APPLICATIONS

This application is based upon and claims the benefit of priority from Japanese Patent Application No. 2012-274586, filed on Dec. 17, 2012, the entire contents of which are incorporated herein by reference.

BACKGROUND OF THE INVENTION

1. Field of the Invention

The present invention relates to an image capturing system.

2. Description of the Related Art

There are needs of performing scanning operation to capture images of desired media such as books, magazines, and documents using mobile imaging units such as cellular phones, smartphones, and digital cameras, and acquire image data. For performing such scanning operation, a mounting stand is provided on which the imaging unit is placed in such a manner that the imaging unit can image a medium setting surface from above (e.g., refer to Japanese Patent Application Laid-open No. 2005-99708).

When the scanning operation is performed using the imaging unit, the imaging unit needs input of some sort of a trigger to start the scanning operation, such as depression of a button by a user. In a state where the imaging unit is placed on the mounting stand, a trigger input unit is not always disposed at a position allowing a user to readily operate the trigger input unit. As a result, there is a concern that a facility of operation may be impaired.

To improve operability, it is conceivable that the imaging unit is electrically coupled to the mounting stand with a connector and externally operated, for example. However, some sort of drudgery is required for physical connection at every placement of the imaging unit on the mounting stand. Such drudgery of setting the imaging unit to the mounting stand could be burdensome for a user.

SUMMARY OF THE INVENTION

It is an object of the present invention to at least partially solve the problems in the conventional technology. According to an aspect of the present invention, an image capturing system, comprises an imaging unit; and a mounting stand to be disposed on a medium setting surface on which a medium serving as a reading target is set, the mounting stand having a placement surface on which the imaging unit is placed at a position allowing the imaging unit to image the medium set on the medium setting surface, wherein when the imaging unit generates a starting trigger based on image information of an imaging area in a state where the imaging unit is placed on the mounting stand, the imaging unit executes a function associated with the starting trigger.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 9A and 9B are schematic diagrams for explaining a technique to determine a second state in which a finger of a user is present on the virtual switch in the first modification of the first embodiment;

DETAILED DESCRIPTION OF THE PREFERRED EMBODIMENTS

Figure 1:
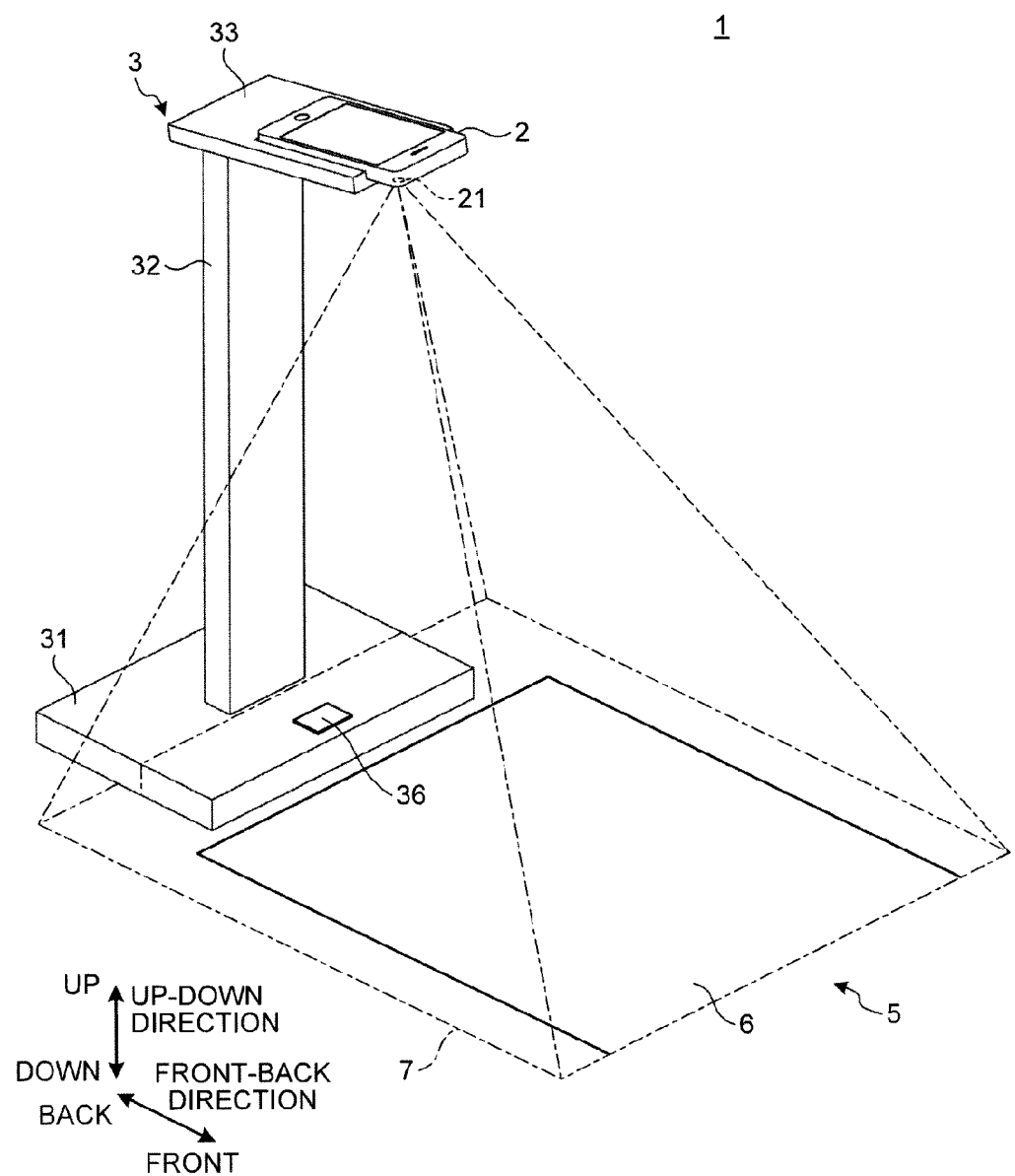
FIG. 1 is a perspective view illustrating a schematic structure of an image capturing system according to a first embodiment of the invention.

Embodiments of an image capturing system according to the invention are described below with reference to the accompanying drawings. In the drawings, the same or corresponding portions are labeled with the same reference numerals and duplicated description thereof is omitted.

First Embodiment

Figure 2:
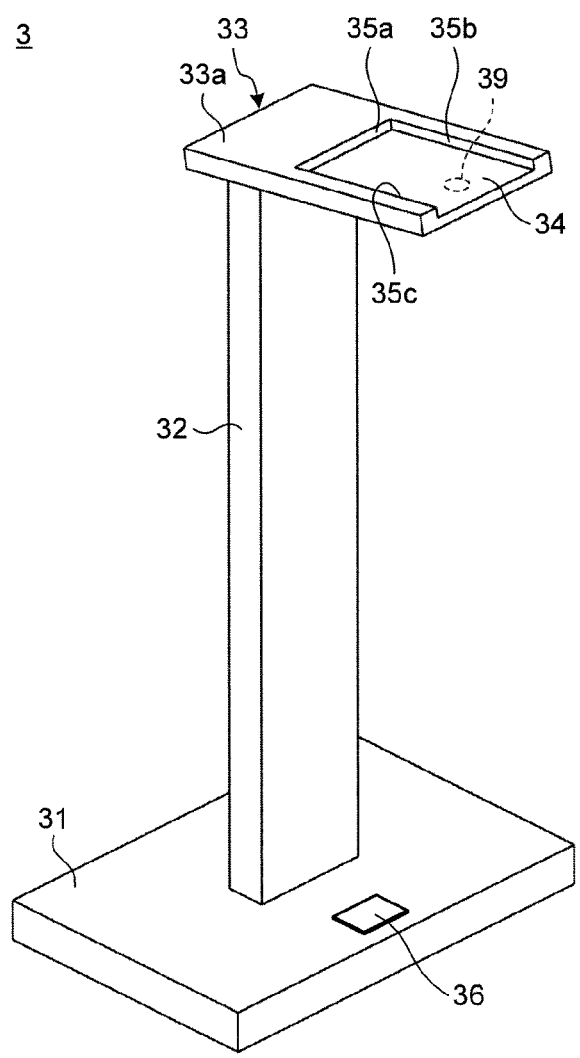
FIG. 2 is a perspective view of a mounting stand in FIG. 1.
Figure 3:
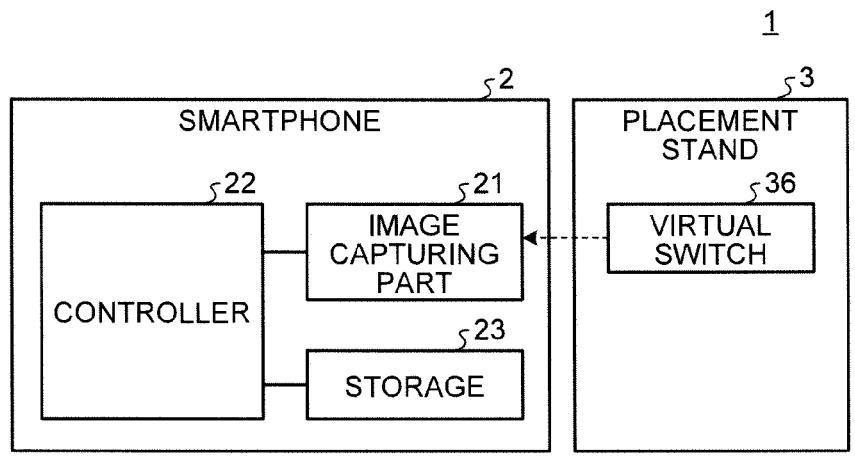
FIG. 3 is a functional block diagram of the image capturing system illustrated in FIG. 1.

A first embodiment of the invention is described with reference to FIGS. 1 to 6B. The structure of an image capturing system according to the first embodiment is described with reference to FIGS. 1 to 3. FIG. 1 is a perspective view illustrating a schematic structure of the image capturing system in the first embodiment. FIG. 2 is a perspective view of a mounting stand in FIG. 1. FIG. 3 is a functional block diagram of the image capturing system illustrated in FIG. 1.

This image capturing system 1 is a scanning system that performs scanning operation to generate image data of a medium 6, which is set on a medium setting surface 5 as a reading target, by capturing image of the medium 6 by a predetermined imaging unit from above. In the embodiment, the description is made with a smartphone 2 having a camera function as an example of the imaging unit.

As illustrated in FIG. 1, the image capturing system 1 includes the smartphone 2 and a mounting stand 3 on which the smartphone 2 is placed when the smartphone 2 performs the scanning operation (here, "scanning operation" means photographing a predetermined area 7 to be imaged, hereinafter, imaged area 7, as described in the specification later). The image capturing system 1 acquires a scanned image (i.e., a photographed image) of the predetermined imaged area 7 by the smartphone 2 when the smartphone 2 is placed at a predetermined position of the mounting stand 3 (i.e. on a placement surface 34, which is described later) and is precisely positioned. In the following description, the up-down direction in FIG. 1 is defined as the up-down direction of the image capturing system 1 and the mounting stand 3. With respect to the image capturing system 1, specifically, with respect to a base 31, as disclosed in FIG. 1, a side facing the medium 6 is defined as the front side of the image capturing system 1 and the mounting stand 3, and an opposite side to the front side is defined as the back side of the image capturing system 1 and the mounting stand 3. A direction from the back side of the image capturing system 1 toward the front side of the image capturing system is defined as a front direction, and a direction opposite to the front direction is defined as a back direction.

The smartphone 2 is provided with an image capturing part 21 relating to the camera function on the rear surface thereof. The image capturing part 21 executes the scanning operation in accordance with an operation command from a controller 22 (refer to FIG. 3) of the smartphone 2. The image capturing part 21 images the whole of the predetermined imaged area 7 and generates a scanned image including the whole of the imaged area 7 in the state where the smartphone 2 is placed on the placement surface 34 of the mounting stand 3.

The mounting stand 3 includes three members of a base 31, an arm 32, and a top unit 33. The base 31 is disposed on the medium setting surface 5. The arm 32 is connected to the upper surface of the base and extends upward from the base 31. The extending direction of the arm 32 may be the vertically upward direction as illustrated in FIGS. 1 and 2, or may be slanted to the front side (on the side where the medium 6 is set) from the vertically upward direction or to the back side (on the side opposite the side where the medium 6 is set) from the vertically upward direction.

The top unit 33 is connected to the arm 32 and extends from the arm 32 such that the top unit 33 faces the medium setting surface 5. In the embodiment, the top unit 33 is connected to an upper end of the arm 32 and extends forward from a position at which the top unit 33 is connected to the arm 32 so as to incline obliquely upward from the horizontal direction. The extending direction of the top unit 33 may be in the forward horizontal direction.

The base 31, the arm 32, and the top unit 33 of the mounting stand 3 are integrally fixed to each other. In other words, the connecting portion of the base 31 and the arm 32 and the connecting portion of the arm 32 and the top unit 33 are fixedly provided so as not to be deformed such as being rotated, removed, or moved.

As illustrated in FIG. 2, the placement surface 34 is provided on an upper surface 33a of the top unit 33 of the mounting stand 3 to place the smartphone 2 thereon at a position enabling the smartphone 2 to image the medium 6 set on the medium setting surface 5.

The placement surface 34 is formed by being recessed from the upper surface 33a. The placement surface 34 is provided such that part of the rear surface of the smartphone 2 in the longitudinal direction projects from the front edge of the top unit 33 when the smartphone 2 is placed on the placement surface 34. In other words, the placement surface 34 is formed backward from the front edge of the top unit 33 (in a direction toward the arm 32) and the area of the placement surface 34 is smaller than that of the rear surface of the smartphone 2. In addition, the length of the placement surface 34 in the front-back direction is smaller than that of the smartphone 2 in the longitudinal direction. As a result, the smartphone 2 is placed on the placement surface 34 such that the image capturing part 21 provided on the rear surface of the smartphone 2 is not covered by the placement surface 34. In other words, the image capturing part 21 is positioned directly facing the medium setting surface 5 when the smartphone 2 is placed on the placement surface 34, thereby making it possible to image the medium 6 on the medium setting surface 5. The placement surface 34 thus formed allows the smartphone 2 to be readily placed on or removed from the placement surface 34 (smooth mounting and dismounting of the smartphone 2).

A step is formed between the upper surface 33a of the top unit 33 and the placement surface 34. More specifically, a step 35a abutting the lower portion of the smartphone 2 in the longitudinal direction, and steps 35b and 35c abutting the left and right side surfaces, respectively, of the smartphone 2 are provided. Namely, the steps 35a, 35b, and 35c are provided so as to abut the smartphone 2 from three directions. The steps 35a and 35b are connected at an approximately right angle, the steps 35a and 35c are connected at an approximately right angle, and the steps 35b and 35c are disposed in parallel in the front-back direction. The smartphone 2 can be positioned at a predetermined position by being abutted to the steps 35a, 35b, and 35c. That is, the steps 35a, 35b, and 35c formed between the upper surface 33a of the top unit 33 and the placement surface 34 function as a positioning unit that positions the smartphone 2 at a predetermined position on the placement surface 34.

Therefore, when the smartphone 2 is placed on the placement surface 34, it is possible to readily position and place the smartphone 2 at a predetermined position on the placement surface 34 simply by abutting the lower portion of the smartphone 2 in the longitudinal direction to the step 35a when the smartphone 2 is placed on the placement surface 34. In addition, the placement surface 34 is inclined downward in the horizontal direction from the front side to the back side of the top unit 33 because the top unit 33 is inclined as described above. That is, since the top unit 33 is connected to an upper end of the arm 32 and extends forward from a position at which the top unit 33 is connected to the arm 32 so as to incline obliquely upward from the horizontal direction, the placement surface 34 is inclined downward in the horizontal direction from the front side to the back side of the top unit 33 when viewed from the front side of the placement surface 34. This allows the smartphone 2 to be readily abutted to the step 35a.

The setting position of the placement surface 34 is set such that a distance is kept between the image capturing part 21 of the smartphone 2 and the medium setting surface 5 so as to enable the image capturing part 21 to photograph the whole of the predetermined imaged area 7 located below the image capturing part 21 when the smartphone 2 is placed on the placement surface 34.

In the embodiment, the mounting stand 3 includes the base 31, the arm 32, and the top unit 33. Another structure, however, may be applicable that allows a distance to be kept between the image capturing part 21 of the smartphone 2 and the medium setting surface 5 so as to enable the image capturing part 21 to photograph the whole of the imaged area 7 when the smartphone 2 is placed on the placement surface 34.

A virtual switch 36 is provided on the upper surface of the base 31 of the mounting stand 3. The virtual switch 36 is not electrically connected to other components of the mounting stand 3 and outputs no information relating to switching operation when being depressed or pressed down. That is, the virtual switch 36 does not function physically or electrically when the virtual switch 36 is pressed down.

The virtual switch 36, however, functions as an input unit that receives an instruction for the scanning operation causing the smartphone 2 to execute the scanning operation from a user. When the user depresses or touches the virtual switch 36, a finger of the user is present on the virtual switch 36. As illustrated in FIG. 1, the imaged area 7 by the smartphone 2 placed on the placement surface 34 of the mounting stand 3 is set such that it includes an area where the medium 6 which is adjacent to the front side of the base 31 of the mounting stand 3 is disposed, and a front portion area which includes the virtual switch 36 on the base 31. As a result, the smartphone 2 always monitors the virtual switch 36 because the virtual switch 36 is included in the imaged area 7 when the smartphone 2 is placed on the placement surface 34. When detecting a state where a finger of the user is disposed on the virtual switch 36 by analyzing a captured or photographed image, the smartphone 2 receives the instruction for the scanning operation from the user. The technique to detect the presence or absence of a finger on the virtual switch 36 is described later.

As illustrated in FIG. 2, a lighting LED 39 is provided to the lower surface, which faces the medium setting surface 5, of the top unit 33 of the mounting stand 3. The lighting LED 39 functions as a lighting device lighting the imaged area 7 during the scanning operation and functions as a light of a desk light, for example, when no scanning operation is executed.

As illustrated in FIG. 3, the smartphone 2 includes the image capturing part 21, the controller 22, and a storage 23. The image capturing part 21 and the storage 23 are electrically connected to the controller 22.

The image capturing part 21 images the imaged area 7 in accordance with a control command from the controller 22 and generates image data. The image capturing part 21 generates image information of the virtual switch 36 included in the imaged area 7 as illustrated in FIG. 2, in the state where the smartphone 2 is placed on the mounting stand 3. The image capturing part 21 outputs the generated image data to the controller 22.

The controller 22 monitors the imaged area 7 using the image capturing part 21 and detects the operation command of the user from the image information of the virtual switch 36. In the embodiment, the operation command of the user functions as a starting trigger to cause the smartphone 2 to start the scanning operation. The controller 22 detects the starting trigger when a finger of the user is placed on the virtual switch 36. The controller 22 determines the presence or absence of the finger of the user on the virtual switch 36 in the imaged area 7 by analyzing the image data captured by the image capturing part 21. When detecting the presence of the finger of the user, the controller 22 generates the starting trigger of the scanning operation. That is, the image information acquired by the image capturing part 21 includes the starting trigger of the scanning operation.

In accordance with the generation of the starting trigger of the scanning operation, the controller 22 executes the scanning operation on the imaged area 7 using the image capturing part 21 and acquires a high quality still image (scanned image) of the imaged area 7. The controller 22 may also generate the scanned image by performing post-processing such as distorted shape correction or noise elimination of the image data acquired by the image capturing part 21. The controller 22 outputs the generated scanned image data to the storage 23 and stores the scanned image data therein. The storage 23 is a storage device that stores therein the scanned image data acquired by the image capturing part 21 and generated by the controller 22.

Figure 4:
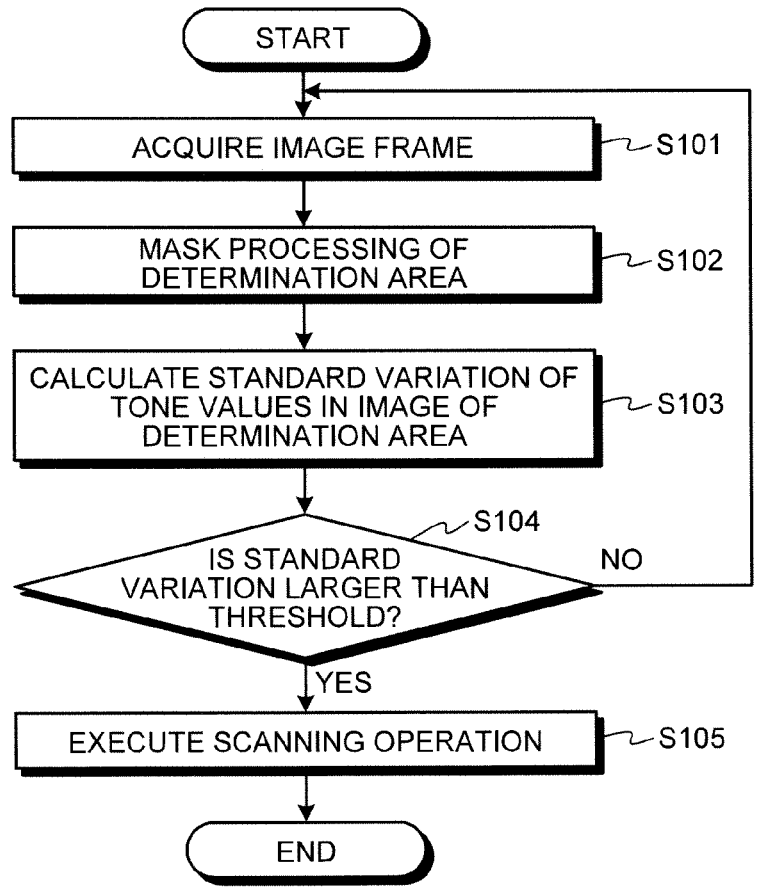
FIG. 4 is a flowchart illustrating a process of capturing an image of a medium performed by the image capturing system in the first embodiment.
Figure 5A:
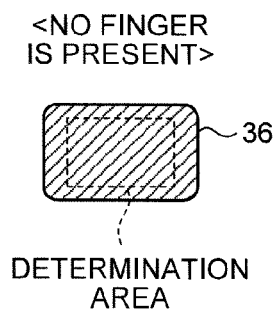
FIGS. 5A and 5B are schematic diagrams for explaining a technique to determine a state in which no finger of a user is present on a virtual switch in the first embodiment.
Figure 5B:
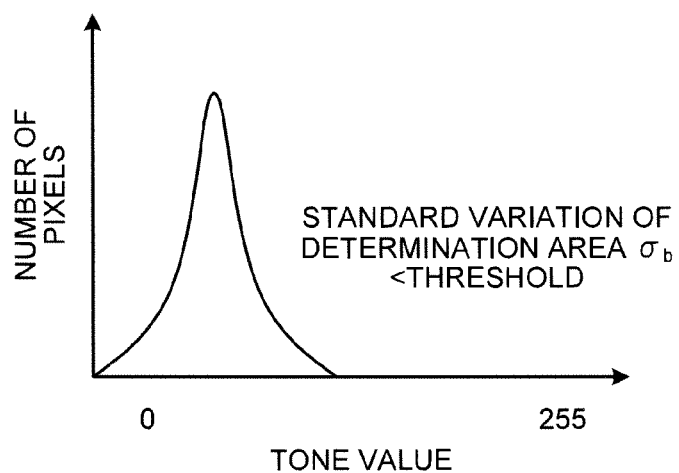
Figure 6A:
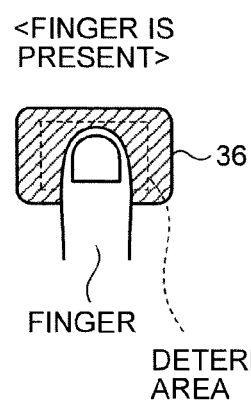
FIGS. 6A and 6B are schematic diagrams for explaining a technique to determine a state in which a finger of a user is present on the virtual switch in the first embodiment.
Figure 6B:
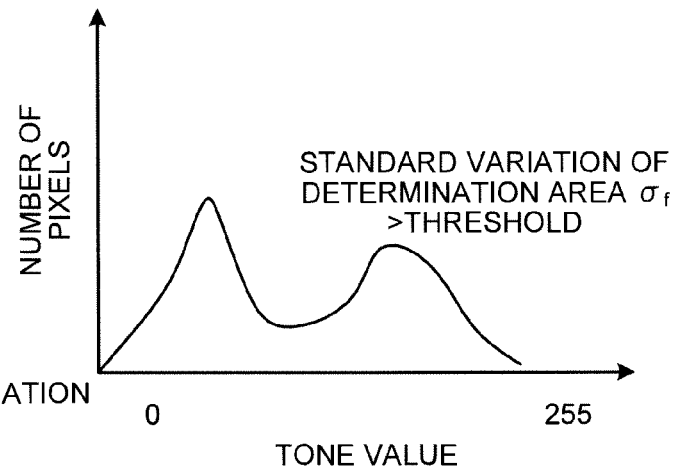

The operation of the image capturing system in the first embodiment is described below with reference to FIGS. 4 to 6B. FIG. 4 is a flowchart illustrating a process of capturing an image of the medium (hereinafter, medium-image capturing process) performed by the image capturing system in the first embodiment. FIGS. 5A and 5B are schematic diagrams for explaining a technique to determine a state where no finger of a user is present on the virtual switch in the first embodiment. FIGS. 6A and 6B are schematic diagrams for explaining a technique to determine a state where a finger of a user is present on the virtual switch in the first embodiment.

The control process illustrated in the flowchart of FIG. 4 is performed by the controller 22 of the smartphone 2 at every predetermined time, for example.

The controller 22 controls the image capturing part 21, and an image frame of the imaged area 7 is acquired (step S101). The controller 22 performs mask processing of a determination area of the acquired image frame (step S102). That is, the image in the determination area is cut out from the image frame of the imaged area 7 acquired at step S101. The determination area is an area of the image information used for determination of the presence or absence of a finger on the virtual switch 36. In the embodiment, the determination area is set with a quadrangular area inside the outer periphery of the virtual switch 36 (refer to FIGS. 5A and 6A).

The following describes the technique to determine the presence or absence of a finger on the virtual switch 36 using the image of the determination area with reference to FIGS. 5A, 5B, 6A, and 6B. FIG. 5A is a schematic diagram illustrating a state where no finger is present on the virtual switch 36. FIG. 5B illustrates the histogram of an image of the determination area when no finger is present on the virtual switch 36. The abscissa axis of the histogram represents the tone value of a pixel in the image while the ordinate axis of the histogram represents the number of pixels having the corresponding tone value in the image. FIG. 6A is a schematic diagram illustrating a state where a finger is present on the virtual switch 36. FIG. 6B illustrates the histogram of the image of the determination area when the finger is present on the virtual switch 36.

In the state where no finger is present on the virtual switch 36 as illustrated in FIG. 5A, only the color of the virtual switch 36 is present in the determination area. As a result, as illustrated in FIG. 5B, the shape of the histogram indicates a distribution shape in which a relatively high peak appears at a specific tone value corresponding to the color of the virtual switch 36 and the numbers of pixels are distributed in a relatively narrow range around the peak as the center. That is, in the state where no finger is present on the virtual switch 36, the standard variation $\sigma_b$ of the histogram of the determination area is relatively small and smaller than a predetermined threshold.

In the state where a finger is present on the virtual switch 36 as illustrated in FIG. 6A, the color of the virtual switch 36 and the color of the finger are present in the determination area because the finger is present in the determination area in the virtual switch 36. As a result, as illustrated in FIG. 6B, the shape of the histogram indicates a distribution shape in which two peaks lower than that in the state where no finger is present appear at the tone value corresponding to the color of the virtual switch 36 and at another tone value corresponding to the color of the finger, and the numbers of pixels are distributed in a wider range including the two peaks than that in the state where no finger is present. That is, in the state where a finger is present on the virtual switch 36, the standard variation $\sigma_f$ of the histogram of the determination area is larger than the standard variation $\sigma_b$ in the state where no finger is present and larger than the predetermined threshold.

In the embodiment, the presence or absence of a finger on the virtual switch 36 is determined using such characteristics of the histogram. Referring back to FIG. 4, the controller 22 calculates the standard variation of the tone values of the pixels of the image using the image of the determination area acquired at step S102 (step S103), and determines whether the calculated standard variation is larger than a predetermined threshold (step S104).

When the standard variation is larger than the threshold as a result of the determination at step S104 (Yes at step S104), it is determined that a finger of a user is placed on the virtual switch 36 because the histogram of the image of the current determination area corresponds to that in the state where a finger is present illustrated in FIG. 6B. As a result, the scanning operation is executed by deeming that the starting trigger of the scanning operation is input by the user (step S105). In the scanning operation, the controller 22 controls the image capturing part 21 and acquires a high quality still image (scanned image) of the imaged area 7. When the image capturing part 21 is disposed inclined as described before with respect to the medium setting surface 5, the captured image acquired by the image capturing part 21 has, for example, a distortion such that the image is long in a lateral direction, i.e., a direction perpendicular to the front-back direction, on the base 31 side and short in the lateral direction on the side opposite the base 31 side. In this case, the controller 22 corrects the distortion of the captured image by performing projective transformation on the image data captured by the image capturing part 21. The scanned image data generated by the controller 22 is stored in the storage 23 of the smartphone 2. Upon completion of the scanning operation, the control process ends.

When the standard variation is equal to or smaller than the threshold as a result of the determination at step S104 (No at step S104), it is determined that no finger of a user is placed on the virtual switch 36 because the histogram of the image of the current determination area corresponds to that in the state illustrated in FIG. 5B where no finger is present. Consequently, the controller 22 determines that the starting trigger of the scanning operation is not input, and returns the process to step S101 to continue the control process.

The effects of the image capturing system in the first embodiment are described below.

The image capturing system 1 of the embodiment includes the smartphone 2 serving as the imaging unit and the mounting stand 3 that is disposed on the medium setting surface 5 on which the medium 6 serving as a reading target is set, and on which the smartphone 2 is placed at a position allowing the smartphone 2 to image the medium 6 set on the medium setting surface 5. In the state where the smartphone 2 is placed on the mounting stand 3, when generating the starting trigger based on the image information of the imaged area 7, the smartphone 2 performs a function (scanning operation) associated with the starting trigger. The starting trigger is generated when the smartphone 2 detects that a finger of a user is placed on the determination area on the virtual switch 36 in the imaged area 7.

This structure makes it possible for a user to input the starting trigger of the scanning operation to the smartphone 2 simply by placing a finger on the virtual switch 36 of the mounting stand 3. The user does not need to directly operate an input unit such as a button provided to the smartphone 2 to start the scanning operation. As a result, the scanning operation is started simply by operating the easy-to-operate virtual switch 3 of the mounting stand 36, which improves the operability of the scanning operation, even if an operation button to start the scanning operation of the smartphone 2 is located at a position where the operation thereof is difficult due to a mounting condition of the smartphone 2.

The smartphone 2 detects the starting trigger from the imaged area 7. That is, the smartphone 2 detects the starting trigger in the imaged area 7 using the image information acquired by the image capturing part 21. As a result, the smartphone 2 detects the starting trigger without being physically or electrically connected with the mounting stand 3. That is, when the scanning operation is performed, it is only required to place the smartphone 2 on the mounting stand 3, thereby improving the facility of the setting. This results in improved operability of the function executable by the smartphone 2 (scanning operation) and greater facility of the setting of the smartphone 2 when the scanning operation is executed.

First Modification of the First Embodiment

Figure 7A:
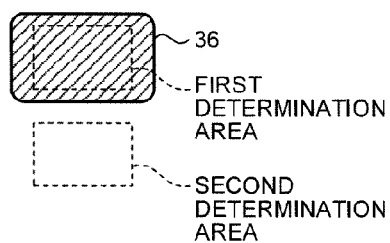
FIGS. 7A and 7B are schematic diagrams for explaining a technique to determine a state in which no finger of a user is present on the virtual switch in a first modification of the first embodiment.
Figure 7B:
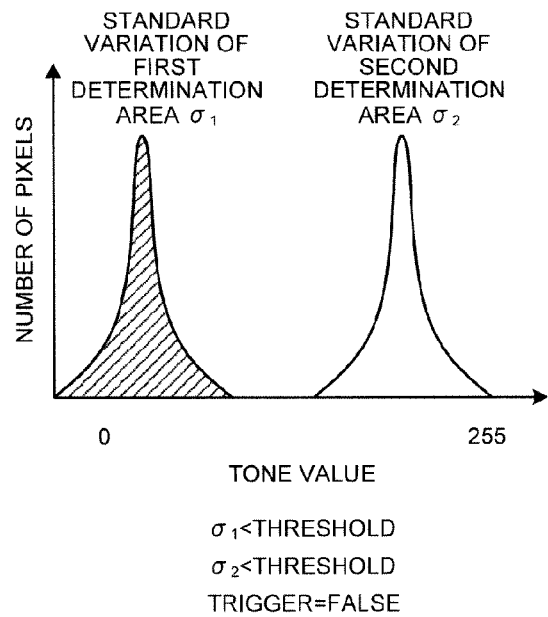
Figure 8A:
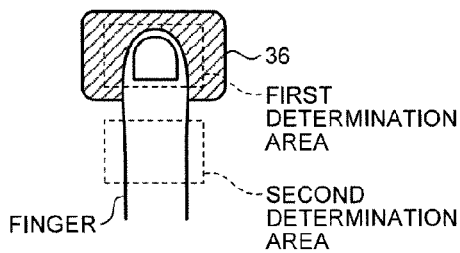
FIGS. 8A and 8B are schematic diagrams for explaining a technique to determine a first state in which a finger of a user is present on the virtual switch in the first modification of the first embodiment.
Figure 8B:
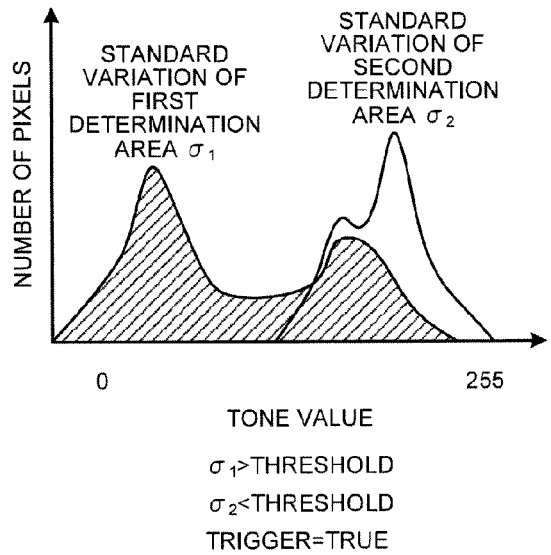

A first modification of the first embodiment is described below with reference to FIGS. 7A to 9B. FIGS. 7A and 7B are schematic diagrams for explaining a state where no finger of a user is present on the virtual switch 36 in the first modification of the first embodiment. FIGS. 8A and 8B are schematic diagrams for explaining a technique to determine a first state where a finger of a user is present on the virtual switch 36 in the first modification of the first embodiment. FIGS. 9A and 9B are schematic diagrams for explaining a technique to determine a second state where a finger of a user is present on the virtual switch 36 in the first modification of the first embodiment.

There may be a case where it is difficult to detect the presence of a finger on the virtual switch 36 by the determination technique of the presence or absence of a finger in the first embodiment described with reference to FIGS. 5A to 6B. For example, when the color of the finger is very similar to that of the virtual switch 36 (refer to FIG. 9A), detection of the presence of the finger is difficult because the presence or absence of a finger is determined based on the tone difference between the virtual switch 36 and the finger. As illustrated in FIGS. 7A to 9B, another determination area (a second determination area) is set near the virtual switch 36, preferably on the front side of the virtual switch 36 on the upper surface of the base 31, in addition to the determination area on the virtual switch 36 (a first determination area). In this case, the second determination area is preferably painted in a color contrasting to that of the virtual switch 36 (e.g., a color relatively similar to a skin color).

In the state where no finger is present on the virtual switch 36 as illustrated in FIG. 7A, only the color of the virtual switch 36 is present in the first determination area and only the color of the upper surface of the base 31 is present in the second determination area. As a result, as illustrated in FIG. 7B, the standard variation $\sigma_1$ of the histogram of the first determination area and the standard variation $\sigma_2$ of the histogram of the second determination area are relatively small and smaller than a predetermined threshold (denoted as "threshold" in FIG. 7B) in the state where no finger is present on the virtual switch 36. At this time, it is determined that the starting trigger of the scanning operation is not input (denoted as "trigger=false" in FIG. 7B).

When a finger is present on the virtual switch 36 and the color of the finger is not similar to that of the virtual switch 36 as illustrated in FIG. 8A, the colors of the virtual switch 36 and the finger are present in the first determination area and the colors of the base 31 and the finger are present in the second determination area with the finger present in the first and the second determination areas. The tone difference between the virtual switch 36 and the finger is larger than that between the base 31 and the finger. As a result, the distance between the two peaks corresponding to the respective colors of the virtual switch 36 and the finger in the histogram of the first determination area is larger than that in the histogram of the second determination area, as illustrated in FIG. 8B. Hence, the standard variation $\sigma_1$ of the histogram of the first determination area is relatively large and larger than the predetermined threshold. In contrast, the standard variation $\sigma_2$ of the histogram of the second determination area is relatively small and smaller than the predetermined threshold. At this time, it is determined that the starting trigger of the scanning operation is input (denoted as "trigger=true" in FIG. 8B).

When a finger is present on the virtual switch 36 and the color of the finger is similar to that of the virtual switch 36 as illustrated in FIG. 9A, the colors of the virtual switch 36 and the finger are present in the first determination area and the colors of the base 31 and the finger are present in the second determination area with the finger present in the first and the second determination areas. The tone difference between the virtual switch 36 and the finger is smaller than that between the base 31 and the finger. As a result, the distance between the two peaks corresponding to the respective colors of the virtual switch 36 and the finger in the histogram of the first determination area is smaller than that in the histogram of the second determination area, as illustrated in FIG. 9B. Hence, the standard variation $\sigma_1$ of the histogram of the first determination area is relatively small and smaller than the predetermined threshold. In contrast, the standard variation $\sigma_2$ of the histogram of the second determination area is relatively large and larger than the predetermined threshold. At this time, it is determined that the starting trigger of the scanning operation is input (denoted as "trigger=true" in FIG. 9B).

That is, it is determined that the starting trigger of the scanning operation is input in the case that the state in which a finger is present is detected in at least one of the first and the second determination areas. This reduces the influence of differences in colors of fingers among users and increases the detection accuracy of the presence or absence of a finger on the virtual switch 36. In addition, the second determination area is provided on the front side of the virtual switch 36, which limits the direction of a finger, when the starting trigger is detected, to the direction from the front side of the mounting stand 3. This limitation makes it possible to exclude an operation done by a user without intending the scanning operation, such as a case where the user places a finger by accident on the virtual switch 36 from a side other than the front side, thereby increasing the detection accuracy.

Second Modification of the First Embodiment

A second modification of the first embodiment is described below. When the determination area is fixed at a position in the imaged area 7, the determination area, which is extracted from the captured image of the image capturing part 21, may be deviated from a target area (area on the virtual switch 36) due to influences of the variations in dimensions of the mounting stand 3 and the gaps between the smartphone 2 and the mounting stand 3 when the smartphone 2 is placed on the mounting stand 3. The position of the determination area in the captured image of the image capturing part 21 may be calibrated when the smartphone 2 is set to the mounting stand 3. This structure makes it possible to reliably set the determination area in the virtual switch 36 and increase the detection accuracy of the presence or absence of a finger on the virtual switch 36.

Third Modification of the First Embodiment

Figure 10:
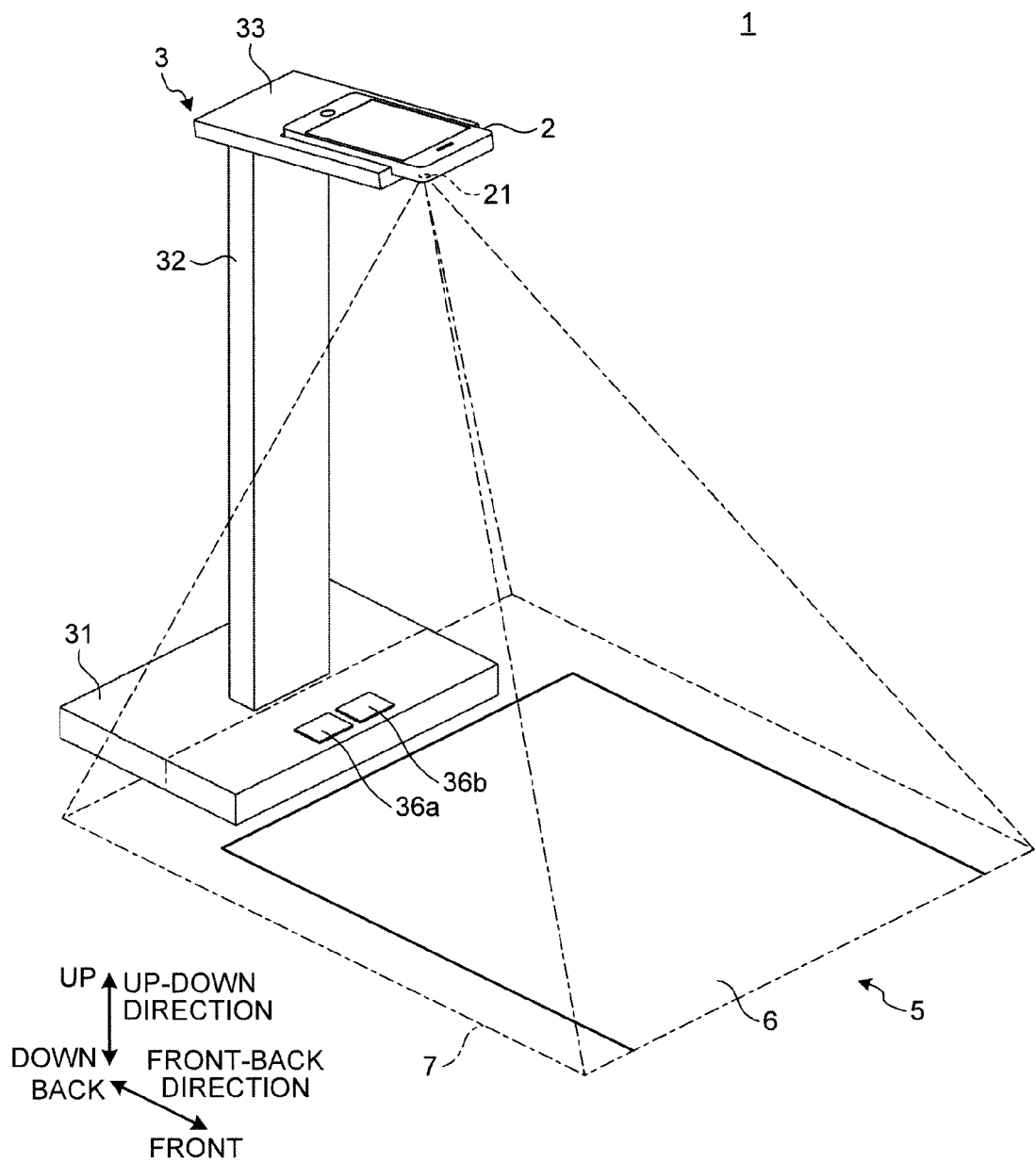
FIG. 10 is a perspective view illustrating a schematic structure of the image capturing system according to a third modification of the first embodiment.
Figure 11:
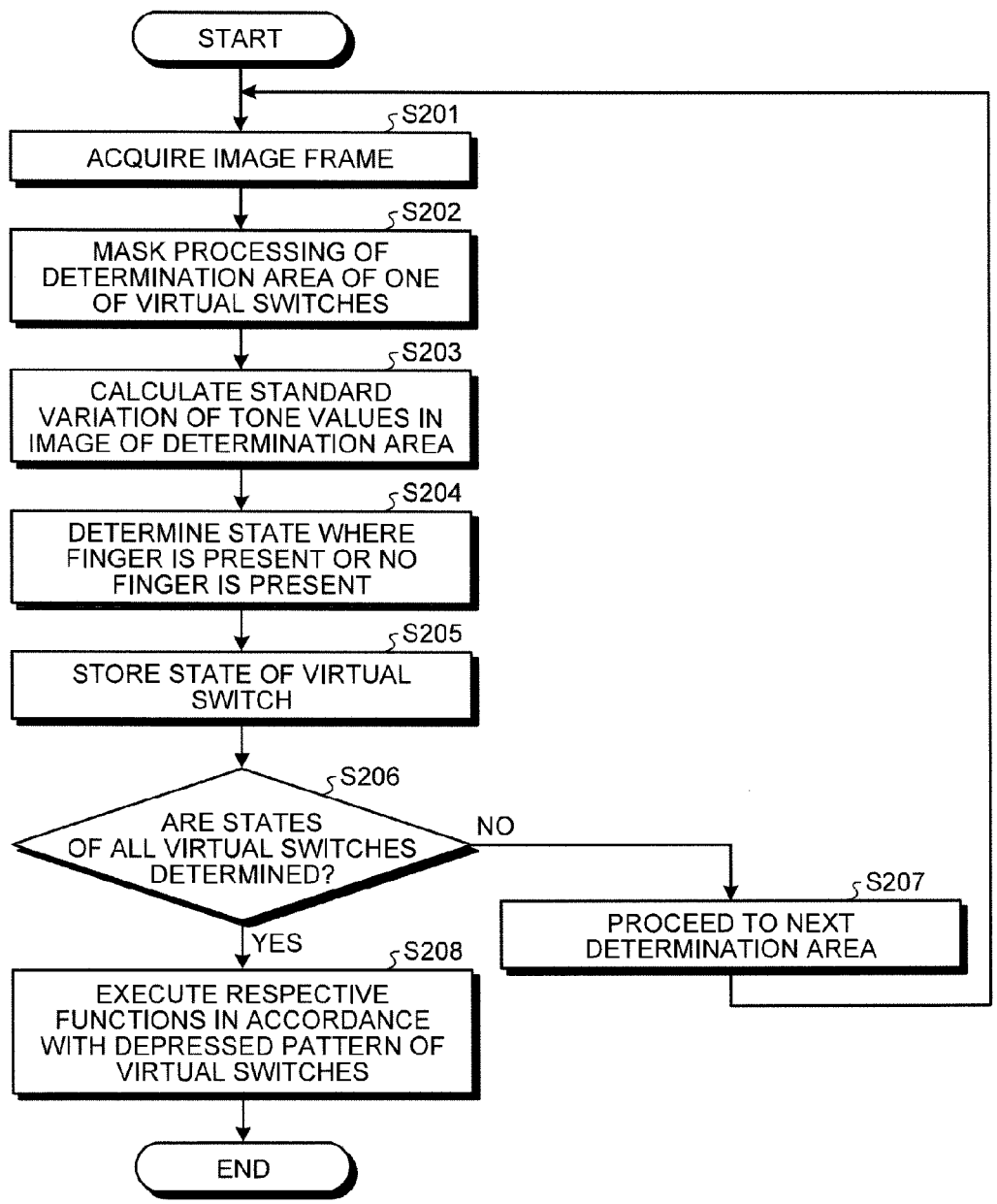
FIG. 11 is a flowchart illustrating processing performed by the image capturing system in the third modification of the first embodiment.

A third modification of the first embodiment is described below with reference to FIGS. 10 and 11. FIG. 10 is a perspective view illustrating a schematic structure of the image capturing system according to the third modification of the first embodiment. FIG. 11 is a flowchart illustrating processing performed by the image capturing system in the third modification of the first embodiment.

As illustrated in FIG. 10, virtual switches 36a and 36b are provided, and the functions executed by the smartphone 2 may be switched by the respective virtual switches 36a and 36b or the combination thereof. Examples of the functions executed by the smartphone 2 include standard scanning, which is the same as that in the first embodiment, cropping of a document area, warp correction when the medium is a book, and stop of scanning. In FIG. 10, the two virtual switches are provided as an example. However, the number of virtual switches is not limited to two, and may be more than two.

The following describes processing to select any of the functions of the smartphone 2 and execute the selected function in the image capturing system 1 in the third modification with reference to the flowchart of FIG. 11.

The controller 22 controls the image capturing part 21 to acquire an image frame of the imaged area 7 (step S201). The mask processing is performed on the determination area set to one of the virtual switches 36a and 36b in the acquired image frame (step S202). That is, the image of the determination area set to one of the virtual switches 36a and 36b is cropped from the image frame of the imaged area 7 acquired at step S201.

The controller 22 calculates the standard variation of the tone values of the pixels in the image, using the image of the determination area acquired at step S202 (step S203). The controller 22 determines whether the determination area is in the state where a finger is present or in the state where no finger is present based on the calculated standard variation (step S204). The state of the virtual switch (i.e., a state where a finger is present or no finger is present) corresponding to the determination area is stored (step S205).

It is checked whether the states of all of the virtual switches 36a and 36b in the image frame are determined (step S206). When there is a virtual switch whose state is not determined as a result of the determination at step S206 (No at step S206), the process proceeds to processing on the next determination area in the image frame (step S207), and thereafter the process returns to step S201, and the control process is continued. That is, the state of the virtual switch associated with the next determination area is determined.

When the states of all of the virtual switches 36a and 36b are determined as a result of the determination at step S206 (Yes at step S206), a depression pattern indicating which virtual switch is depressed is obtained based on the determined states of the respective virtual switches, the function is selected based on the pressed down pattern, and the selected function is executed (step S208). Upon completion of the processing at step S208, the control process ends.

As described above, the image capturing system 1 in the third modification of the first embodiment has a plurality of sets of the starting trigger and the function associated with the starting trigger. That is, the virtual switches 36a and 36b are provided and a plurality of functions are associated with the respective switches. As a result, the functions can be selectively used simply by performing a simple motion of placing a finger on either of the virtual switches 36a and 36b, thereby improving the operability of the functions executable by the smartphone 2.

Second Embodiment

Figure 12:
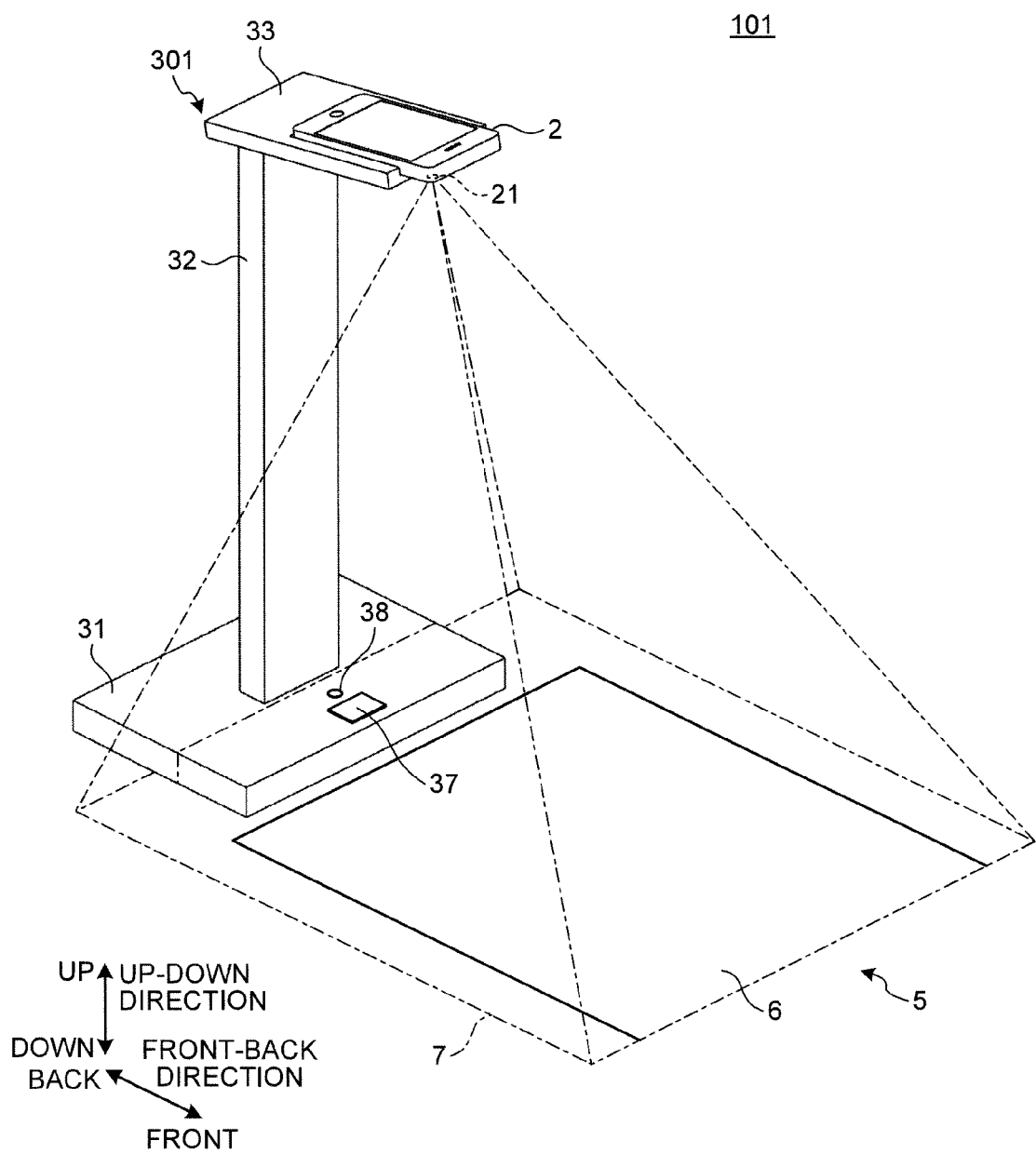
FIG. 12 is a perspective view illustrating a schematic structure of an image capturing system according to a second embodiment of the invention.
Figure 13:
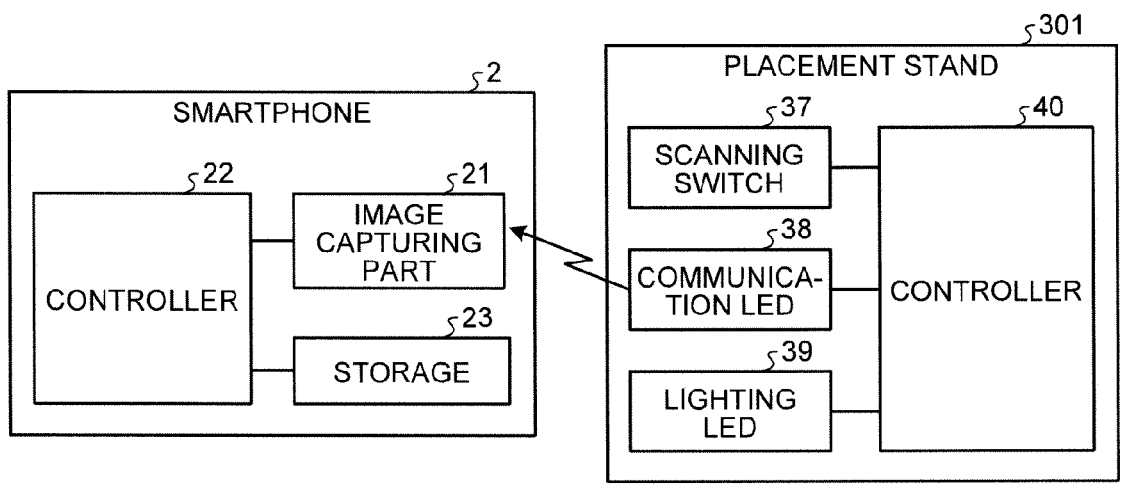
FIG. 13 is a functional block diagram of the image capturing system illustrated in FIG. 12.
Figure 14:
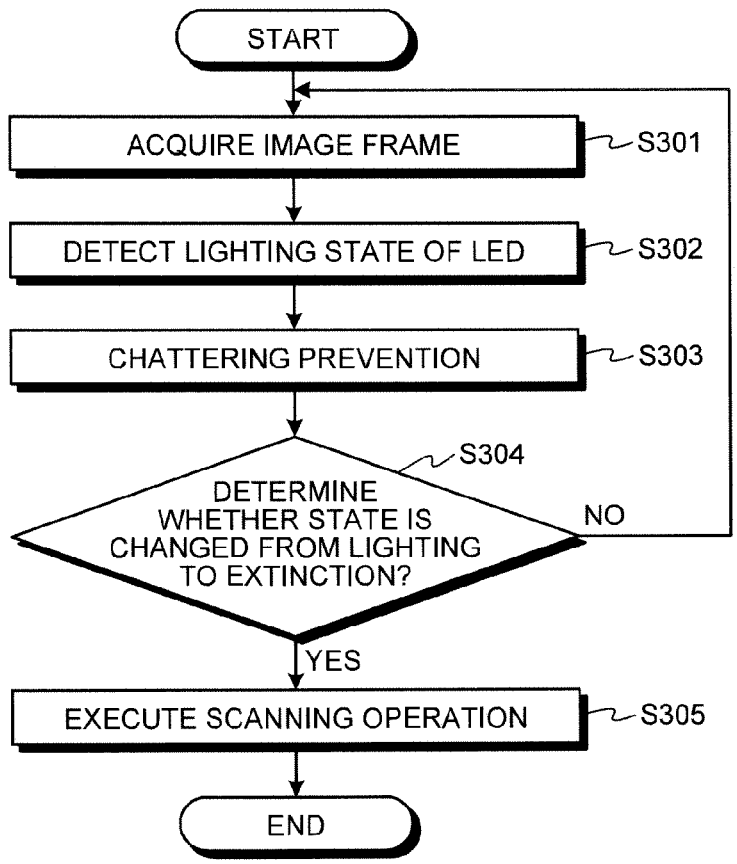
FIG. 14 is a flowchart illustrating a process of capturing an image of a medium performed by the image capturing system in the second embodiment.

A second embodiment of the invention is described below with reference to FIGS. 12 to 14. FIG. 12 is a perspective view illustrating a schematic structure of an image capturing system according to the second embodiment. FIG. 13 is a functional block diagram of the image capturing system illustrated in FIG. 12. FIG. 14 is a flowchart illustrating medium imaging processing performed by the image capturing system in the second embodiment.

As illustrated in FIG. 12, this image capturing system 101 of the embodiment differs from the image capturing system 1 of the first embodiment in that, as the input units of the scanning operation, a scanning switch 37 and a communication LED 38 are provided to the base 31 of a mounting stand 301.

As illustrated in FIG. 13, the scanning switch 37, the communication LED 38, and the lighting LED 39 are electrically connected to a controller 40 provided inside the mounting stand 301.

The scanning switch 37 is an input unit that receives instruction for the scanning operation to cause the smartphone 2 to execute the scanning operation from a user. When the scanning switch 37 is depressed, the controller 40 of the mounting stand 301 causes the communication LED 38 to output an optical signal to cause the smartphone 2 to start the scanning operation. That is, the optical signal output from the communication LED 38 is an imaging starting trigger to the smartphone 2 placed on the placement surface 34. An infrared LED may be used for the communication LED 38 so that invisible optical signal prevents the user from feeling uncomfortable.

The image capturing part 21 receives the optical signal transmitted from the communication LED 38 in the predetermined imaged area 7 in the state where the smartphone 2 is placed on the placement surface 34 of the mounting stand 301. As illustrated in FIG. 12, the imaged area 7 by the smartphone 2 placed on the placement surface 34 of the mounting stand 301 is set such that it includes an area in which the medium 6 is disposed and which is adjacent to the front side of the base 31 of the mounting stand 301, and the front portion, which includes the communication LED 38, of the base 31.

The controller 22 monitors the imaged area 7 using the image capturing part 21 and detects the optical signal of the communication LED 38 by analyzing the image data captured by the image capturing part 21.

The medium-image capturing process performed by the image capturing system 101 in the second embodiment is described with reference to FIG. 14.

The controller 22 controls the image capturing part 21 to acquire an image frame of the imaged area 7 (step S301). The controller 22 detects a lighting state of the communication LED 38 from the acquired image frame (step S302). The lighting state of the communication LED 38 is, specifically, a time-series signal turning to either the "on" state (lighting) or the "off" state (extinction). Processing of chattering prevention is performed on the time-series signal in the lighting state of the communication LED 38 (step S303). Based on this signal, it is determined whether the lighting state of the communication LED 38 is changed from extinction (off) to lighting (on) (step S304).

When it is determined at step S304 that the lighting state of the communication LED 38 is changed from extinction to lighting (Yes at step S304), the controller 22 determines that the scanning switch 37 is depressed and thus the starting trigger of the scanning operation is input by a user, and executes the scanning operation (step S305). Upon completion of the processing at step S305, the control process ends.

When it is determined at step S304 that the lighting state of the communication LED 38 is not changed from extinction to lighting as a result (No at step S304), the controller 22 determines that the scanning switch 37 is not depressed and thus the starting trigger of the scanning operation is not input, and returns the process to step S301 to continue the control process.

As described above, in the image capturing system 101 in the second embodiment, the mounting stand 301 includes the communication LED 38, and the imaged area 7 by the smartphone 2 placed on the mounting stand 301 is set such that it includes the communication LED 38. The staring trigger is generated when the optical signal output from the communication LED 38 is detected by the smartphone 2 in accordance with the motion (depressing the scanning switch 37) performed by a user with respect to the mounting stand 301.

This structure makes it possible for a user, who only needs to press down the scanning switch 37 of the mounting stand 301, to input the starting trigger of the scanning operation to the smartphone 2 by the optical signal output from the communication LED 38 in accordance with the depressing, thereby improving the operability of the scanning operation.

The embodiment describes an example structure in which the optical signal is output from the communication LED 38 in accordance with the pressing down of the scanning switch 37 of the mounting stand 301 performed by a user. Another structure may be applicable in which the optical signal output from the communication LED 38 in accordance with input by another motion of a user performed with respect to the mounting stand 301, e.g., the user touches another portion of the mounting stand 301.

Modification of the Second Embodiment

Figure 15:
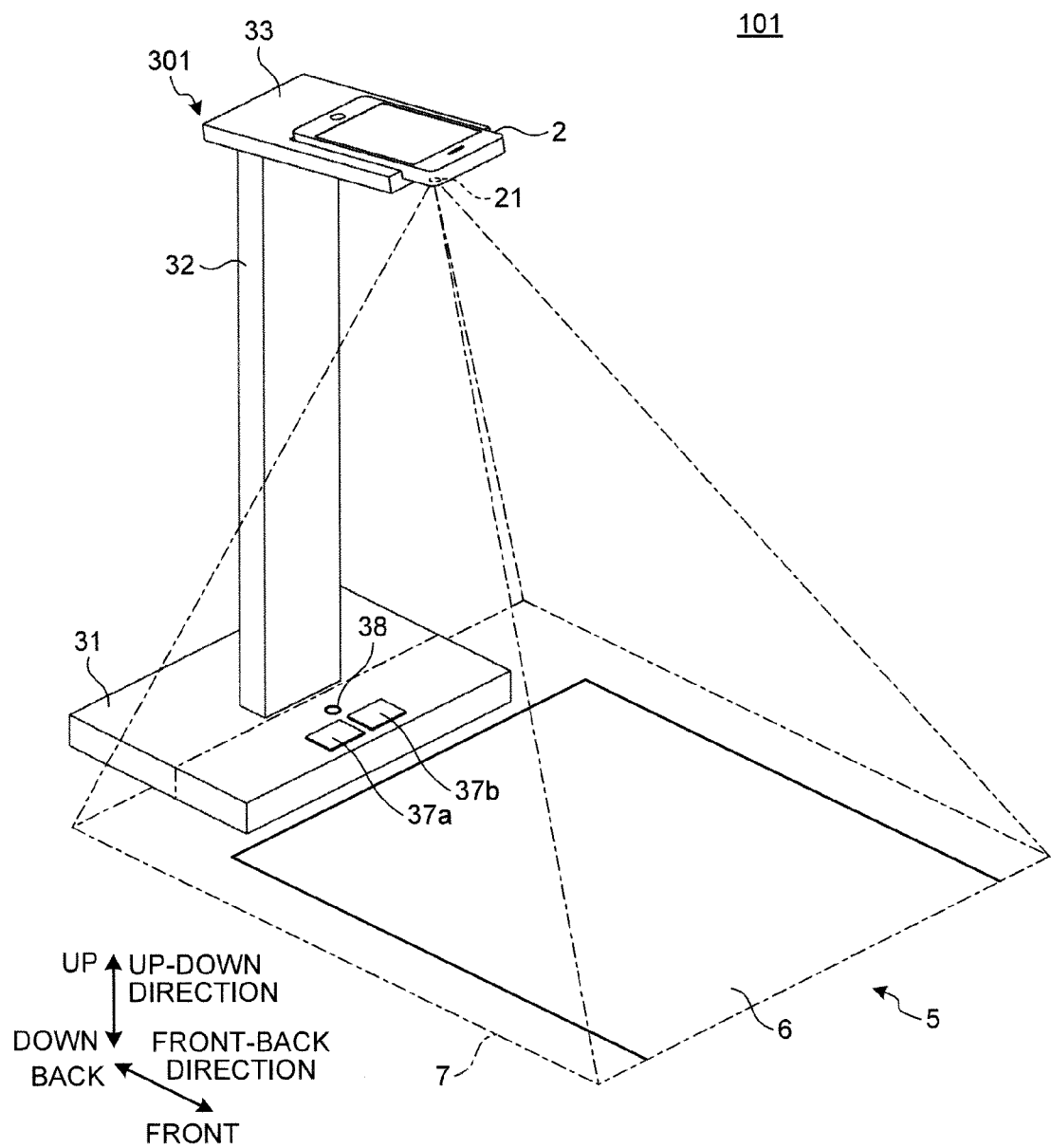
FIG. 15 is a perspective view illustrating a schematic structure of the image capturing system according to a modification of the second embodiment.
Figure 16:
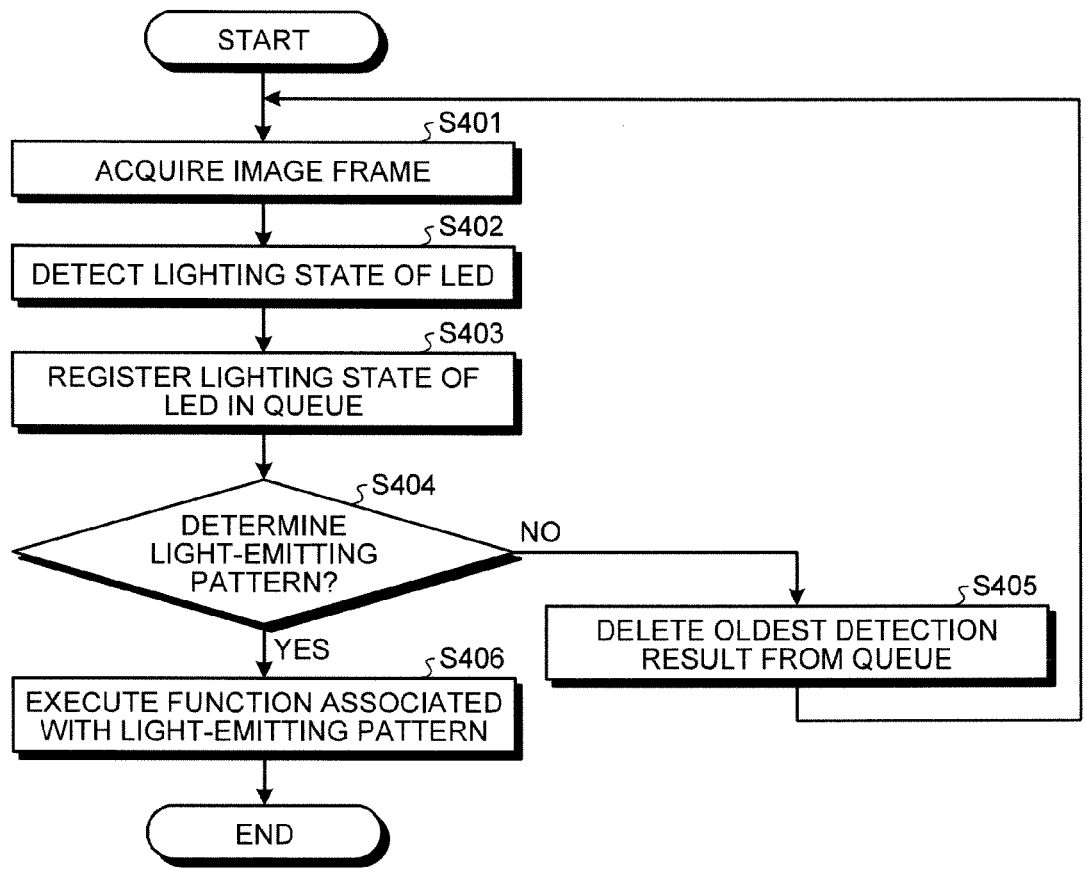
FIG. 16 is a flowchart illustrating processing performed by the image capturing system in the modification of the second embodiment.
Figure 17:
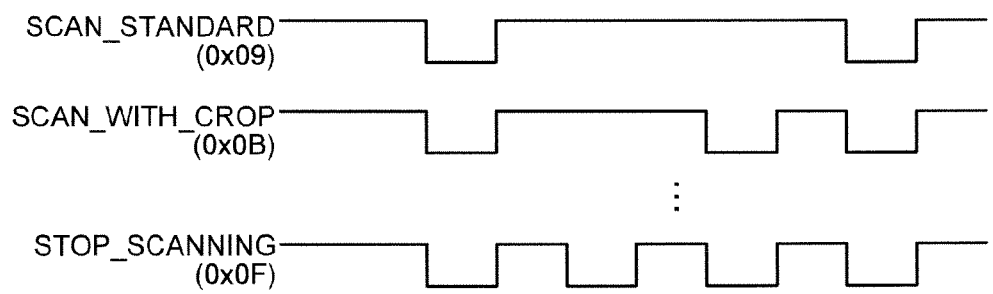
FIG. 17 is a schematic diagram illustrating examples of light-emitting patterns of a communication LED set for the respective functions of a smartphone, which are used in the modification of the second embodiment.

A modification of the second embodiment is described below with reference to FIGS. 15 to 17. FIG. 15 is a perspective view illustrating a schematic structure of the image capturing system according to the modification of the second embodiment. FIG. 16 is a flowchart illustrating processing performed by the image capturing system in the modification of the second embodiment. FIG. 17 is a schematic diagram illustrating examples of light-emitting patterns of the communication LED 38 set for the respective functions of the smartphone and used in the modification of the second embodiment.

As illustrated in FIG. 15, scanning switches 37a and 37b are provided, and the functions executed by the smartphone 2 may be switched by the respective scanning switches 37a and 37b or the combination thereof. Examples of the functions executed by the smartphone 2 include the standard scanning, which is the same as that in the first embodiment, cropping of a document area, warp correction when the medium is a book, and stop of scanning. In FIG. 15, the two scanning switches are provided as an example. The number of scanning switches is not limited to two, and may be more than two.

The controller 40 of the mounting stand 301 changes the light-emitting pattern of the communication LED 38 in accordance with the function of a scanning switch depressed out of the scanning switches 37a and 37b. The light-emitting patterns are set for the respective functions of the smartphone 2 associated with the respective scanning switches. FIG. 17 illustrates examples of the light-emitting patterns of the communication LED 38, which are set for the standard scanning (SCAN_STANDARD), the cropping (SCAN_WITH_CROP), and the stop of scanning (STOP_SCANNING). The light-emitting patterns are the time-series signals turning to either the "on" state (lighting) or the "off" state (extinction) as illustrated in FIG. 17. The light-emitting patterns are stored in the controller 40 of the mounting stand 301 and also stored in the controller 22 of the smartphone 2 for pattern matching.

The following describes processing to select any of the functions of the smartphone 2 and execute the selected function in the image capturing system 101 in the modification of the second embodiment with reference to the flowchart of FIG. 16.

The controller 22 of the smartphone 2 controls the image capturing part 21 to acquire an image frame of the imaged area 7 is acquired (step S401). The controller 22 detects the lighting state of the communication LED 38 of the mounting stand 301 from the acquired image frame (step S402) and the acquired lighting state is registered in a queue (step S403). The queue stores therein the lighting states of the communication LED 38 for a predetermined period of time.

The controller 22 performs a pattern determination determining whether the time-series information of the lighting states of the communication LED 38 stored in the queue matches the predetermined light-emitting patterns associated with the respective functions of the smartphone 2 (step S404).

When the time-series information of the lighting states of the communication LED 38 stored in the queue does not match the predetermined light-emitting patterns associated with the respective functions of the smartphone 2 as a result of the determination at step S404 (No at step S404), the controller 22 determines that none of the scanning switches 37a and 37b are depressed and thus the starting trigger of the scanning operation is not input, and deletes the oldest or first-in detection result from the queue (step S405). Thereafter the process returns to step S401, from which the control process is continued.

When the time-series information of the lighting states of the communication LED 38 stored in the queue matches the predetermined light-emitting patterns associated with the respective functions of the smartphone 2 as a result of the determination at step S404 (Yes at step S404), the controller 22 determines that either one of the scanning switches 37a and 37b is depressed and thus the starting trigger of the scanning operation is input by a user, and executes the functions associated with the light-emitting patterns (step S406). Upon completion of the processing at step S406, the control process ends.

As described above, the image capturing system 101 in the modification of the second embodiment has a plurality of sets of the starting trigger and the function associated with the starting trigger. That is, the scanning switches 37a and 37b are provided and a plurality of functions are associated with the respective switches. As a result, the functions can be selectively used simply by performing a simple motion of depressing either one of the scanning switches 37a and 37b. This further improves the operability of the functions executable by the smartphone 2.

While the embodiments of the invention have been described, the embodiments have been presented by way of examples only, and are not intended to limit the scope of the invention. The embodiments described herein may be implemented in a variety of other forms. Furthermore, various omissions, substitutions, and changes of the embodiments described herein may be made without departing from the scope of the invention. The accompanying claims and their equivalents are intended to cover the embodiments or the modifications as would fall within the scope of the invention.

In the embodiments, descriptions are made with the smartphone 2 having a camera function as an example of the imaging unit imaging the medium serving as a reading target. The invention are applicable to other imaging units such as digital cameras, personal digital assistants (PDAs), cellular phones, notebook computers, and personal handyphone systems (PHSs) having camera functions.

In the second embodiment, the optical signal of the communication LED 38 is used as the imaging starting trigger of the scanning operation output from the mounting stand 3 to the smartphone 2. Instead, the lighting LED 39 may transmit the optical signal.

In the second embodiment, the optical signal is used as the imaging starting trigger. Any information that can be detected based on the captured image of the image capturing part 21 may be used. For example, information other than the optical signal such as a gesture may be used.

An image capturing system of the invention provides the advantage of having improved operability of a function executable by an imaging unit and greater facility of setting the imaging unit when the function is executed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing system, comprising:
    an imaging unit; and
    a mounting stand to be disposed on a medium setting surface on which a medium serving as a reading target is set, the mounting stand having a placement surface on which the imaging unit is placed at a position allowing the imaging unit to image the medium set on the medium setting surface, and a base having a virtual switch on a surface of the base, wherein
    when the imaging unit generates a starting trigger based on an operation command for scanning operation detected from image information of the virtual switch on the surface of the base in a state where the imaging unit is placed on the mounting stand, the imaging unit executes a function associated with the starting trigger.

2. The image capturing system according to claim 1, wherein the starting trigger is generated when the imaging unit detects that a finger is placed in a predetermined determination area in an imaging area.

3. The image capturing system according to claim 1, wherein an imaging area of the imaging unit placed on the mounting stand is set such that the imaging area includes the virtual switch on the surface of the base, and
    the starting trigger is generated when the imaging unit detects a presence of a finger of a user on the virtual switch.

4. The image capturing system according to claim 1, wherein the image capturing system includes a plurality of sets of the starting trigger and the function associated with the starting trigger.

* * * * *